Sept. 14, 1965  R. E. VINCENT ETAL  3,205,934
HYDROGEN PEROXIDE VAPORIZATION
Filed Nov. 13, 1961
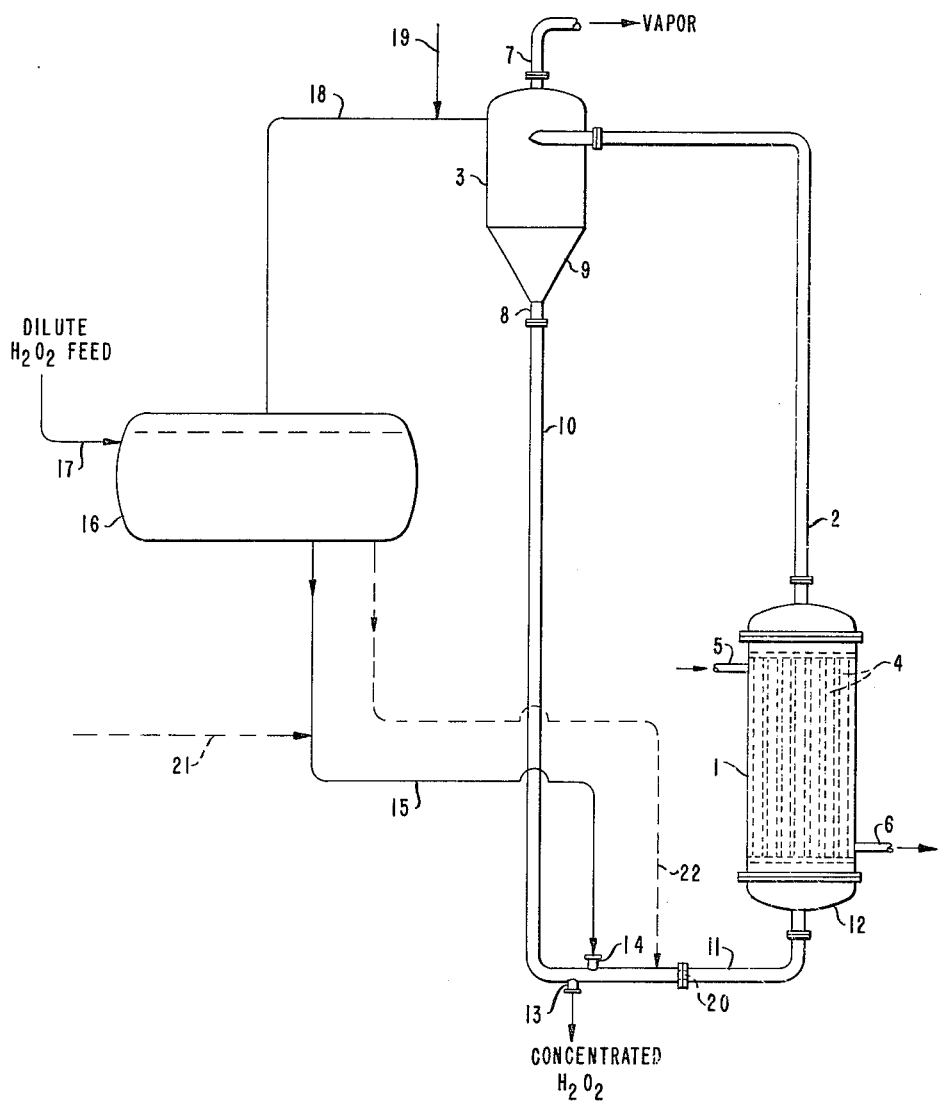
INVENTORS:
    WILLIAM R. KEELER
    ROBERT E. VINCENT
BY: *Millard L. Caldwell*
THEIR ATTORNEY

United States Patent Office 3,205,934
Patented Sept. 14, 1965

3,205,934
HYDROGEN PEROXIDE VAPORIZATION
Robert E. Vincent, Lafayette, and William R. Keeler, Berkeley, Calif., assignors to Shell Oil Company, New York, N.Y., a corporation of Delaware
Filed Nov. 13, 1961, Ser. No. 152,051
3 Claims. (Cl. 159—47)

This invention relates to the concentration and/or purification or other treatment of aqueous hydrogen peroxide involving its vaporization. It deals with an improved method for carrying out such vaporizations with minimum danger of explosion.

The distillation or other vaporization of hydrogen peroxide is carried out on a large scale safely and efficiently without danger when proper care is taken to avoid detonation hazards. These hazards are chiefly of two kinds. One is vapor phase explosion when the hydrogen peroxide concentration of the vapors is allowed to become too high. This danger is readily avoided by using proper pressure and employing heating means such, for example, as indirect heat transfer from steam at constant pressure, which provides a practically constant operating temperature without need for careful supervision. Liquid phase explosion is the other source of danger in the vaporization of hydrogen peroxide, especially of hydrogen peroxide containing impurities which can lead to hydrogen peroxide reaction under certain conditions. Carbonaceous materials are examples of impurities of this type which are encountered, for instance, in the purification of hydrogen peroxide manufactured from organic starting materials such, for example, as alkyl anthraquinones or alcohols. Danger from this source also can be readily avoided since the concentration limits of peroxide and/or impurities which insure safe operation at a given temperature are well known. Constant care is necessary, however, to insure that these limits are not exceeded during the vaporization. Automatic devices for shutting off the heat supply in response to changes in liquid level and/or temperature in the vaporizer are helpful for this purpose but because of their fallibility they do not eliminate the need for constant vigilance on the part of the operator. Previous methods of evaporation have not provided any protection against the serious danger of explosion arising through failure to keep the evaporating surface wet with peroxide solution at all times. This danger arises because the vapor in equilibrium with a liquid hydrogen peroxide solution is more dilute in hydrogen peroxide than the liquid. Consequently the last drops of hydrogen peroxide solution before dryness are very rich in peroxide. The non-volatile carbonaceous impurities present in the feed are simultaneously concentrated making the peroxide mixture remaining on the heat transfer surface just before dryness, highly explosive. An important object of the present invention is the provision of a method of hydrogen peroxide vaporization in which danger of the liquid in the vaporizer reaching a detonatable composition is minimized through automatic addition of water or a more dilute hydrogen peroxide solution whenever abnormal conditions occur in the vaporizer. This is accomplished without need for intervention by the operator or reliance on mechanical devices and protects personnel and equipment.

The vaporization method of the invention comprises heating a body of liquid aqueous hydrogen peroxide and vaporizing hydrogen peroxide therefrom while supplying hydrogen peroxide of lower concentration to said body of aqueous hydrogen peroxide from a reservoir in which the liquid level is maintained substantially the same as the liquid level of said body of liquid in the vaporizer and maintaining the amount of said more dilute hydrogen peroxide solution in the reservoir substantially in excess of the weight of liquid in the vaporizer. Advantageously the body of liquid hydrogen peroxide is heated at a point above the bottom thereof and the peroxide solution in the reservoir is in direct, substantially unobstructed communication with the body of liquid hydrogen peroxide in the bottom of the vaporizer at a point below the point at which the body is heated therein.

Operating in this way with feed of dilute hydrogen peroxide flowing by gravity from the reservoir to the vaporizer and the feed reservoir kept at the same pressure as the vaporizer, most advantageously, by a pipe line connecting the two vapor spaces, insures automatic dilution of the hydrogen peroxide being vaporized by more dilute peroxide from the reservoir whenever the level of solution in the vaporizer falls. This dilution will prevent the hydrogen peroxide in the vaporizer from reaching a detonatable composition as long as there is dilute peroxide in the reservoir. Thus the danger of explosion due to the peroxide becoming too concentrated as a result of interruption of the feed supply to the system or too rapid vaporization caused by excessive rates of heat input to the vaporizer can be practically eliminated since the supply of dilute peroxide in the reservoir will be substantially in excess of the weight of hydrogen peroxide solution in the vaporizer.

The method is of special advantage when evaporating hydrogen peroxide in a reboiler used in combination with a vapor separator. With this type of apparatus the liquid hold up in the vaporizer can be relatively small for a given vaporization rate, and not only can the equipment be smaller for a given throughput rate with consequent saving in construction cost, but also the losses from hydrogen peroxide decomposition during evaporation can be reduced. The vaporizer as referred to herein includes a reboiler in which the hydrogen peroxide solution is partially vaporized, a vapor separator and connecting piping to form a loop whereby liquid-vapor mixture from the reboiler is conducted to the separator and liquid from the separator is returned to the reboiler. According to one advantageous modification of the method of carrying out the invention, shown diagrammatically in the accompanying drawing which is not to scale, and, for the sake of simplicity, does not show the control valves and auxiliary equipment whose use in the system will be apparent to those skilled in the art, the vaporization is carried out in a thermosyphon reboiler 1 connected by conduit 2 to a cyclone separator 3. The reboiler 1 can be of conventional construction, for example, a heater with a bundle of vertical tubes 4 which are externally heated, for instance, by hot oil or more preferably, condensing steam supplied, for example, by inlet 5 and taken off by outlet 6. The reboiler is connected at the top to conduit 2 which is connected to the cylindrical cyclone separator 3 so the mixture from the reboiler 1 enters the separator at a point midway between the vapor exit port 7 at the top and the outlet for liquid 8 which is attached to the conical bottom 9. Liquid recycle lines 10 and 11 connects this liquid outlet with the inlet port at the bottom of the reboiler below the tubes therein. The reboiler is advantageously constructed with a dished base 12 below the tube bundle or some other way is provided for maintaining a body of hydrogen peroxide solution in the vaporizer below the point where the peroxide is heated therein.

The liquid recycle line 11 is equipped with an outlet 13 for removal of concentrated hydrogen peroxide solution, preferably so positioned as to provide a drain through which a part of the recycle stream can be withdrawn for recovery of the concentrated solution and the entire unit can be emptied for cleaning or other purposes. Between this drain and the bottom of the reboiler is an inlet 14 to which is connected a pipe 15 which is attached to an outlet port in a reservoir 16 to which is supplied the line 17 aqueous hydrogen peroxide which is to be evaporated. This reservoir preferably has a capacity in substantial excess of the weight of aqueous hydrogen peroxide which will be in the reboiler and liquid recycle line during operation. The reservoir also should be positioned so as to provide therein at a level above the tops of the heated tubes in the reboiler, an amount of hydrogen peroxide solution at least equal to, and preferably in excess of, the capacity of the reboiler. It is usually desirable to maintain maximum level of liquid in the reservoir below the outlet port 8 at the bottom of the vapor separator 3. A line 18 connects the top of the reservoir with the separator so that the pressure in the vapor spaces in these vessels is approximately the same and about equal to that in the vapor space above the liquid in the reboiler tubes. As a result, the liquid level in the separator section of the vaporizer will always be the same as that in the reservoir including its feed line 15 to the reboiler. An air inlet line 19 for supplying air to the pressure equalizing line 18 which joins the reservoir with the vapor separator is provided to prevent flow of hot vapors back into the reservoir.

In operation of this modification of the invention, hydrogen peroxide solution from the reservoir will enter the bottom of the tubes 4 of the reboiler together with recycled hydrogen peroxide from the separator 3. Partial evaporation of the hydrogen peroxide solution will take place in the reboiler tubes. Preferably the heat supplied to the reboiler is adjusted so that not more than 50% of the solution is vaporized. It is also important when the hydrogen peroxide feed to the system contains significant amounts, for instance, 0.2 or more grams per liter, of carbonaceous material, that the heat input be regulated so that the concentration of peroxide in the liquid mixture being evaporated does not exceed 70% at any point, and more preferably has a concentration of about 55% to about 60%, by weight. The rate of withdrawal of concentrated liquid hydrogen peroxide stream from the recycle line should also be controlled so its content of carbonaceous material does not reach an explosive composition. The vapor generated in the reboiler tubes forms a froth with the liquid peroxide solution which moves at high velocity up the tubes and through the conduit 2 connecting with the cyclone separator 3. After separation of the vapor in the separator, the unvaporized liquid now having a higher concentration of hydrogen peroxide passes downward through the recycle line and returns to the bottom of the reboiler 1 after dilution with more dilute hydrogen peroxide which is supplied by gravity flow from the reservoir 16. The thermosyphon action in the reboiler tubes 4 thus establishes a circuit comprising an aqueous peroxide stream flowing upward through the reboiler into the separator and back to a body of hydrogen peroxide solution in the bottom 12 of the vaporizer. The desired rate of liquid recycle to the reboiler from the separator can be obtained by the use of a restriction orifice 20 in the liquid recycle line 10, advantageously between the reboiler 1 and the inlet line 14 connected with the reservoir.

This system provides trouble-free, efficient evaporation without any risk of explosion since it is easy when feeding hydrogen peroxide of the usual composition, for instance about 5 to about 45% weight $H_2O_2$, advantageously about 5 to 35% concentration and up to about 10 grams of carbonaceous material per liter, to maintain a considerable margin of safety between the bottoms composition and the detonatable limit. It is only necessary to provide a continuous feed of dilute hydrogen peroxide by line 15, a uniform heat supply by line 5, for example, and regular draw off of bottom product from the liquid recycle line 10 and 11 by line 13. Any interruption of the feed supply will be immediately compensated for by hydrogen peroxide from the reservoir which, because of its elevation above the top of the reboiler tubes 4, will continue to supply dilute peroxide to the evaporation zone so there will be no danger of the evaporator tubes becoming dry and of the solution becoming over concentrated as long as liquids remain in the reservoir. Also because of the position of the reservoir above the reboiler tubes, the reboiler will be flooded with dilute peroxide solution in case of a shut down. This minimizes the possibility for locally high concentrations of peroxide in the reboiler tubes when the thermosyphon action stops due to failure to form enough vapor to carry the unvaporized liquid out of the evaporator because of insufficient heat supply resulting from either an external interruption of the source of heat or from obstruction of the evaporator tubes.

The amount of hydrogen peroxide which it will be most desirable to maintain in the reservoir will depend upon the rate at which the peroxide solution is being evaporated and the length of time of uninterrupted operation which it is desired to provide in case of an interruption of the feed supply to the system. It is usually advantageous to provide a minimum of at least one-quarter hourly operating volume of hydrogen peroxide solution in the reservoir and more preferably between about one-third and two hourly operating volumes. Generally an amount of hydrogen peroxide feed solution at least 5 times the weight of liquid in the evaporator unit including recycle line will be suitable for maintenance in the reservoir although it may be advantageous under certain conditions to maintain in the reservoir at least 9 times the amount of liquid in the evaporator unit.

As previously indicated, it is desirable that the reservoir be in direct, substantially, unobstructed communication with the vaporizer and at the same pressure so as to insure that whenever the liquid level falls in the vaporizer the hydrogen peroxide therein will be diluted by peroxide solution from the reservoir without need for intervention by the operator or reliance upon mechanical devices. With a forced circulation vaporizer instead of the thermosyphon type described in the foregoing illustrative example, there will be a circulating pump not shown, in vertical pipe line 10 to return liquid from the separator 3 to the reboiler 1 but gravity feed of dilute hydrogen peroxide from the reservoir 16 to the vaporizer by lines 15, 14, and 11, for instance, can still be used to obviate drying up of the reboiler tubes 4 as long as there is liquid in the reservoir.

The following example further illustrates the invention and shows some of the advantages of the new method:

Aqueous hydrogen peroxide of 22% wt. $H_2O_2$ concentration was evaporated in a vaporizer constructed of stainless steel having a steam jacketed reboiler tube of ¾ inch internal diameter which was connected to the vapor separator section of a column which was three inches in diameter by three feet long. The feed was vaporized in the reboiler by heat exchange with condensing steam. A constant rate of vaporization of the feed was provided by a constant temperature in the steam jacket of the reboiler. The temperature in the steam jacket was maintained constant by an electronic temperature controller which regulated the flow of steam to the jacket. Feed flowed to the reboiler by gravity from the feed reservoir in which a constant liquid level was maintained. This arrangement insured a liquid level at all times in the reboiler. The feed reservoir was kept at the vaporizer pressure by a line connecting the two vapor spaces. A small air bleed prevented vapor from the reboiler from condensing in the feed reservoir. Recycle liquid was withdrawn intermittently through an air operated motor valve with a variable off-on cycle of 10 seconds. The reboiler was constructed of stainless steel while the column was built of Pyrex glass.

Using a temperature of 70° C. in the reboiler and a pressure of 60 mm. mercury at the top of the column, the residence time of the peroxide in the vaporizer was seven minutes at a feed rate of 36 grams per minute of peroxide solution. The recycle liquid withdrawn at the rate of 2.4 grams per minute had a concentration of 66% wt. hydrogen peroxide and contained 20% of the peroxide in the feed. With a hydrogen peroxide feed containing carbonaceous impurities equivalent to 0.8 wt. percent carbon based on the $H_2O_2$ content, the recycle liquid contained 2.4 wt. percent carbon compared with a detonatable limit of 3.7 wt. percent carbon based on blasting cap detonation boundary determinations. By maintaining 1440 grams of hydrogen peroxide solution in the feed reservoir or about 17 times the amount of liquid in the evaporator at a level above the top of the heated reboiler tube, a 40 minute safety period in the event of inadvertent feed shutoff is provided. This volume of dilute hydrogen peroxide in the reservoir is more than adequate to flood the reboiler should the heated tube begin to go dry.

There are special advantages in supplying the hydrogen peroxide feed solution to the vaporizer from the reservoir as in the foregoing modification of the invention. In this way, the hydrogen peroxide solution is constantly replaced by fresh solution so there is no build up of impurities which may promote peroxide decomposition. It is not essential to operate in this way, however, since the hydrogen peroxide feed solution can be supplied to the vaporizer directly by line 21 shown as a broken line to emphasize its alternative use, feeding into line 15 and the reservoir 16 can be connected either directly to the vaporizer by line 22 or to the branch line attached to the direct feed line 21. In either of these cases, the reservoir will be, as before, in unobstructed communication with the reboiler tubes. In this method of operation one can maintain in the reservoir, instead of hydrogen peroxide feed solution, water or hydrogen peroxide solution of lower concentration than the feed solution. Because of the location of this aqueous diluent at a level above the top of the heated reboiler tubes and in unobstructed communication with the bottom thereof, it will serve in the way previously described, to flood the reboiler tubes and prevent explosions therein due to drying out of any portion of the heat transfer surface should thermosyphoning action stop. This flooding will be automatic because of the provision of means for equalizing the pressure in the reservoir and reboiler. It will completely submerge the reboiler tubes with hydrogen peroxide solution more dilute than the peroxide solution in the vaporizer at the time because the amount of dilution medium maintained in the reservoir will be in excess of that required for this flooding.

These modifications of the preferred method of operation also provide at least the same period of safe continued operation after inadvertent stoppage of the feed to the system as is provided when the hydrogen peroxide feed solution is supplied to the reservoir instead of directly to the vaporizer. The period of safe operation under such circumstances can be even longer when maintaining a lower concentration of hydrogen peroxide in the reservoir than in the feed solution. By providing sufficient volume of aqueous diluent of low hydrogen peroxide concentration, the concentration of peroxide in the vaporizer will be prevented from reaching a dangerous level without reliance on mechanical safety devices, operator vigilance or surging of the liquid between the reservoir and vaporizer. When such a diluent of lower hydrogen peroxide content is maintained in the reservoir in direct communication with the reboiler, provision should be made for minimizing back mixing of feed solution or recycle liquid with the aqueous diluent in the reservoir. This can be accomplished by adjusting the dimensions of the liquid line connecting the reservoir with the vaporizer. It is also desirable to provide means for supplying aqueous diluent to the reservoir to maintain the desired concentration of hydrogen peroxide in the reservoir if backmixing occurs.

Still other changes can be made in the method of carrying out the invention which is not limited to those given in the foregoing as illustrative examples only.

We claim as our invention:

1. In a method of vaporizing hydrogen peroxide by heating liquid aqueous hydrogen peroxide under thermosyphon conditions in a heated tube having a vapor space thereabove, discharging a mixture of the resulting vapors and unvaporized hydrogen peroxide solution from the upper end of said tube, delivering the mixture to a separator and separating vapor from unvaporized hydrogen peroxide therein, and returning separated unvaporized hydrogen peroxide solution to the bottom of the heated tube, the improvement which comprises:
   (a) supplying hydrogen peroxide feed solution to the bottom of said heated tube,
   (b) providing a reservoir in direct, permanently open communication with the bottom of said tube which reservoir has a vapor space which is maintained at substantially the same pressure as the pressure in the vapor space present above said heated tube by means of a permanently open pipe line connecting said vapor spaces,
   (c) maintaining in said reservoir at a level above the top of said heated tube a body of water in which the hydrogen peroxide concentration is zero to about the concentration in said hydrogen peroxide feed solution through a balance of the static and velocity heads in said heated tube against the static head in the reservoir and its unobstructed connection with the bottom of said tube during said vaporization, the amount of said water being maintained in excess of that required to submerge said tube in liquid whenever the thermosyphon action stops in said tube.

2. A process in accordance with claim 1 in which the water in said reservoir has a hydrogen peroxide concentration the same as that in the hydrogen peroxide feed solution and is sufficient to supply at least one-fourth hourly operating volume of hydrogen peroxide solution for the system.

3. A process in accordance with claim 2 in which the hydrogen peroxide feed solution which is to be evaporated is supplied to said reservoir.

References Cited by the Examiner

UNITED STATES PATENTS

| | | | |
|---|---|---|---|
| 2,520,870 | 8/50 | Wood et al. | 202—57 |
| 2,734,566 | 2/56 | Simms | 159—44 |
| 2,741,584 | 4/56 | Holmes et al. | 202—64 |
| 2,910,119 | 10/59 | Wennerberg | 159—44 X |
| 2,960,448 | 11/60 | Straub et al. | 202—56 |

NORMAN YUDKOFF, *Primary Examiner.*

CHARLES O' CONNELL, *Examiner.*